United States Patent Office 3,346,345
Patented Oct. 10, 1967

3,346,345
EXTRACTION OF PLUTONIUM AND NEPTUNIUM FROM AQUEOUS SOLUTIONS
Wallace W. Schulz, Richland, Wash., assignor to the United States of America as represented by the United States Atomic Energy Commission
No Drawing. Filed Feb. 9, 1965, Ser. No. 431,480
6 Claims. (Cl. 23—340)

ABSTRACT OF THE DISCLOSURE

A method of separating plutonium and neptunium values from aqueous acid solutions by adding hydrazine to the acid solution to selectively reduce the neptunium to the tetravalent state and contacting the solution with an organic solution of trilaurylamine to extract the tetravalent neptunium and tetravalent plutonium. After separating the organic phase from the aqueous waste solution, the neptunium values and plutonium values are extracted by an aqueous hydroxylamine sulfate stripping solution.

---

This invention relates to the extraction of plutonium and neptunium values from aqueous solutions and in particular with an improvement of the so-called Purex process. The Purex process broadly comprises the extraction of actinide values away from fission product values from aqueous nitric acid solutions of nuclear fuel with organic tributyl phosphate solutions.

Tertiary alkyl amines, including trilaurylamine, have been used for the recovery of neptunium and plutonium values from aqueous nitric acid solutions. This is the subject matter of assignee's U.S. Patent No. 3,047,360, granted to John C. Sheppard on July 31, 1962.

The patented process mentioned above is not satisfactory when applied to aqueous waste solutions as they are obtained in the Purex process and which usually contain too high a content of plutonium and neptunium to justify their disposal. It is believed that this is due to the fact that neptunium is present in these waste solutions in the pentavalent state which is nonextractable into trilaurylamine, while plutonium is present in the solvent-extractable tetravalent state. A great many reducing agents were investigated for the purpose of converting the neptunium to the tetravalent state. However, most of these had the drawback that they reduced not only the neptunium to the tetravalent state but also the plutonium to the trivalent state, which, like neptunium (V), is nonextractable by trilaurylamine.

It has been discovered in the course of the above-described investigations that, when hydrazine is used as the reducing agent at room temperature, the pentavalent neptunium is reduced to the tetravalent state without there taking place a reduction of the tetravalent plutonium.

The process of this invention thus comprises adding hydrazine to an aqueous neptunium- and plutonium-containing nitric acid waste solution at room temperature, which is about 25° C., whereby the neptunium is selectively reuced to the tetravalent state; contacting the solution with an organic, water-immiscible solution of trilaurylamine, whereby both tetravalent neptunium and tetravalent plutonium are taken up by an organic trilaurylamine extract phase, while other components, such as fission product values, remain in the aqueous solution; and separating the organic phase from the aqueous waste solution.

It has furthermore been found that the neptunium and plutonium values can be practically quantitatively stripped from the organic phase by means of hydroxylamine sulfate, $(NH_2OH)_2 \cdot H_2SO_4$. This back-extraction also is most effective when carried out at a temperature of 50°–60° C. The stripped trilaurylamine can then be recycled several times. However, from time to time regeneration is necessary in order to reduce the radioactivity that is due to the presence of fission products, and in particular of ruthenium, zirconium and niobium. Regeneration can be accomplished, it was established, by washing the stripped trilaurylamine with an aqueous solution of permanganate, such as potassium permanganate.

Thus the process of this invention also comprises adding hydrazine to a neptunium- and plutonium-containing aqueous nitric acid waste solution at room temperature, whereby the neptunium is selectively reduced to the tetravalent state; contacting the solution with an organic, water-immiscible solution of trilaurylamine, whereby both tetravalent neptunium and tetravalent plutonium are taken up by an organic trilaurylamine extract phase, while other components, such as fission product values, remain in the aqueous solution; separating the organic phase from the aqueous waste solution; contacting the organic phase with an aqueous hydroxylamine sulfate stripping solution at room temperature, whereby neptunium values and plutonium values are taken up by said aqueous stripping solution while any fission product values that had been co-extracted into the trilaurylamine solution remain in the trilaurylamine phase; and recycling the trilaurylamine solution for a number of times into new batches of hydrazine-reduced aqueous waste solution, each time repeating stripping with hydroxylamine sulfate. Regeneration after a number of cycles by contacting the stripped trilaurylamine phase with an aqueous solution of permanganate for the removal of extracted radioactive fission products, when combined with the other steps of my novel process, is also part of this invention.

For the selective reduction of the pentavalent neptunium to the tetravalent state, the hydrazine is preferably added in the form of an aqueous solution of a concentration of between 0.02 and 0.05 M. As already mentioned, the solutions are mixed at room temperature. While the time allowed for the reduction of the neptunium should not be excessively high and, for instance, should not be in the order of days, some digestion is necessary to obtain complete reduction. A period of between 30 and 60 minutes was found to yield quantitative reduction results without there taking place any essential reduction of tetravalent plutonium to the trivalent state.

After this, extraction proper is carried out by the addition of the trilaurylamine. As already indicated, the trilaurylamine is advantageously added in the form of an organic solution; this is preferable, because trilaurylamine per se has a rather high viscosity, which makes phase separation difficult. Saturated hydrocarbons of low viscosity, such as kerosene, xylene and mixtures of petroleum hydrocarbons, are best suited for this purpose. A hydrocarbon mixture sold under the trade name Soltrol-170 in a quantity to obtain a trilaurylamine solution of between 0.2 and 0.3 M has been used for the studies that led to this invention. (Soltrol-170 is a paraffinic hydrocarbon mixture with the following typical boiling range: initial boiling point at 424° F.; 10% distilled at 429° F.;

20% at 432° F.; 50% at 437° F.; 70% at 440° F.; 90% at 448° F.; 95% at 454° F.; and end point at 463° F. Soltrol-170 has a specific gravity, at 60° F., of 0.7728; a refractory index at 20° C. of 1.4315; a flash point at 760 mm. Hg of 192° F. and a fire point of 210° F. The flash and fire points were determined in accordance with ASTM methods D56–52 and D92–52, respectively.) Most of the time about equal volumes of hydrazine-containing feed solution and trilaurylamine solution were used and found satisfactory. It will, however, be obvious that the ratio can be varied widely. The acidity of the aqueous waste solution to be extracted preferably ranges between 4 and 7 M.

Other tertiary amines were also studied for the process of this invention but found not as satisfactory as the trilaurylamine because they formed two organic phases.

The organic trilaurylamine extract phase is then separated from the aqueous fission-products-containing waste solution by means known to those skilled in the art. The waste solution can then be discarded or it can be processed for the recovery of some of the fission products. This phase, however, is not part of this invention.

The organic extract phase is then treated with an aqueous solution of hydroxylamine sulfate for the back-extraction of the neptunium and plutonium values away from any coextracted fission products. This back-extraction step is improved by heating the mixture slightly, preferably to between 50 and 60° C. The concentration of the hydroxylamine sulfate solution is not critical, but it preferably is between 0.03 and 0.06 M. About equal volumes of stripping solution and organic extract phase were used; however, also this ratio is by no means critical and thus does not have to be adhered to rigidly. Hydroxylamine sulfate is a very effective stripping agent at elevated temperature, because it has a reducing component, $NH_2OH$, and a complexing component, $H_2SO_4$. It is so effective that only one single batch contact with it is necessary to strip above 99% of the plutonium and above 95% of the neptunium.

As already stated, the trilaurylamine can be reused after stripping for a great many times. The number of times for which it is reusable, of course, depends on its content of coextracted fission products, and in particular on the content of the highly radioactive isotopes of zirconium, niobium and ruthenium. From time to time a regeneration step is applied to back-extract these radioactive fission products and possibly any residual plutonium and neptunium that might not have been removed by the stripping step with hydroxylamine sulfate. This regeneration is carried out with an alkaline aqueous solution of permanganate, preferably of potassium permanganate, and it, too, yields improved results when carried out at slightly elevated temperature, such as at between 50 and 60° C.

In the following, a few examples are given to illustrate the process of this invention.

*Example I*

Two synthetic waste solutions were used for the extraction with trilaurylamine after the addition of varying quantities of hydrazine. Solution No. 1 contained free nitric acid in a concentration of 6.31 M and a total nitrate concentration of 6.95 M; waste solution No. 2 was 5.0 M in nitric acid and 5.7 M in total nitrate. Both solutions contained ferric ions in a concentration of 0.35 M, tetravalent plutonium and pentavalent neptunium each in a concentration of about $10^{-5}$ M. Extraction was carried out at 25° C. After the addition of the respective hydrazine solutions, the solutions were allowed to stand for 30 minutes, whereupon each was contacted with an equal volume of trilaurylamine in Soltrol-170, also at 25° C.

The extraction coefficients (organic:aqueous), "$E_a°$," for both neptunium and plutonium and the concentrations used of trilaurylamine (TLA) and hydrazine are compiled in Table I. The dashes in this table and in others given later indicate that analytical determinations were not made.

TABLE I

| Solution No. | TLA, M | $N_2H_4$, M | $E_a°$ Np | $E_a°$ Pu |
|---|---|---|---|---|
| 1 | 0.3 | 0.0 | 0.73 | 68 |
| 1 | 0.3 | 0.022 | 20.0 | 80 |
| 1 | 0.2 | 0.0 | ------ | 56 |
| 1 | 0.2 | 0.022 | ------ | 65 |
| 2 | 0.3 | 0.011 | 36 | ------ |
| 2 | 0.3 | 0.022 | 34 | ------ |
| 2 | 0.2 | 0.0 | ------ | 62 |
| 2 | 0.2 | 0.022 | ------ | 28 |
| 2 | 0.3 | 0.05 | 39 | ------ |

The above data show that without the addition of hydrazine the neptunium extraction is negligibly low and that the best over-all extraction is obtained with a 0.3 M trilaurylamine solution and the 0.022 M and 0.05 M hydrazine solutions.

A number of extraction runs were also carried out with the synthetic solution designated in Table I as Solution No. 1, after various groups of fission product contaminants had been added thereto. Again extraction was carried out, upon addition of an about equal volume of 0.02 M hydrazine, with a 0.3 M trilaurylamine solution in Soltrol-170 at 25° C. The extraction coefficients, organic:aqueous, are summarized for the various contaminants in Table II.

TABLE II

| Contaminant: | $E_a°$ |
|---|---|
| Ru-Rh-106 | 0.082 |
| Ce-Pr-144 | 0.0073 |
| Fe(Fe-59) | 0.0010 |
| Zr-Nb-95 | 0.00093 |
| Eu(Eu-152) | 0.00050 |
| Cr(Cr-51) | 0.00023 |
| Sr(Sr-85) | 0.00014 |
| Cs(Cs-127) | 0.000025 |

Table II shows that very small fractions of the fission products were extracted into the trilaurylamine solution. The extraction of plutonium and niobium was not determined in this instance.

*Example II*

An actual plant waste solution as it was obtained in the uranium, neptunium and plutonium extraction with tributyl phosphate was used in this example. The solution was 4.3 M in nitric acid, 0.25 M in ferric ion, $10^{-5}$ M each in plutonium and neptunium; the latter was predominantly present in the pentavalent state.

Four runs were carried out, three by adding hydrazine in a quantity to yield a concentration of 0.02 M, the fourth in a quantity to yield a concentration of 0.05 M. The solution had a temperature of about 25° C. The conditions and results are juxtaposed in Table III. After allowing the hydrazine-containing solution to digest for the time indicated in Table III, a 0.3 M trilaurylamine solution in Soltrol-170 was added, also at 25° C. Equal volumes of organic and aqueous solutions were used. The periods of time during whch aqueous and organic phases were contacted, or "digested," are also listed in Table III. After the specified contacts, the aqueous and organic phases where separated, and the aqueous phases were analyzed for residual, nonextracted, plutonium and neptunium contents.

TABLE III

| $N_2H_4$ M | Digestion Times, min. Reduction | Digestion Times, min. Extraction | Percent Not Extracted Pu | Percent Not Extracted Np |
|---|---|---|---|---|
| 0.02 | 30 | 30 | 0.48 | 1.9 |
| 0.02 | 30 | 60 | 0.55 | 1.5 |
| 0.02 | 60 | 10 | 0.68 | 6.4 |
| 0.05 | 30 | 10 | 0.47 | 2.7 |

The best results were obtained in the first run using 0.02 M hydrazine, 30 minutes each for reduction and extraction. In the third run the residual neptunium was somewhat high and out of line; this might be based on an analytical error; apart from this, the discrepancies were minor.

*Example III*

Another set of experiments was carried out in order to determine the effect of contact time and temperature in the back-extraction or stripping of the neptunium and plutonium values with hydroxylamine sulfate from trilaurylamine solutions. The trilaurylamine solutions of neptunium and plutonium were obtained as described in Example II and were 0.3 M in trilaurylamine in Soltrol-170; they contained neptunium in a concentration of $10^{-5}$ M and plutonium in a concentration of $10^{-5}$ M, both in the tetravalent state. An equal volume of 0.05 M aqueous hydroxylamine sulfate stripping solution was added to these trilaurylamine solutions. The time and temperature conditions and the percentages of plutonium and neptunium not back-extracted from the trilaurylamine solutions under these conditions are summarized in Table IV.

TABLE IV

| Time, min. | Temp., °C. | Percent Pu | Not Stripped Np |
|---|---|---|---|
| 10 | 25 | 57.1 | |
| 30 | 25 | 6.9 | |
| 10 | 50 | 1.3 | 3.5 |
| 30 | 50 | 0.7 | 4.6 |
| 60 | 50 | 0.8 | 2.4 |
| 30 | 60 | 0.5 | |
| 60 | 60 | 0.3 | 3.5 |

A stripping time of 10 minutes and a temperature of 25° C. (first run) clearly is not satisfactory for the back-extraction of plutonium. Likewise, the second run shows that even at a contact time of 30 minutes a temperature of 25° C. was not satisfactory. Therefore the neptunium concentration was not determined in these two runs and also not in the sixth run. Good results, however, were obtained with temperatures of 50 and 60° C. and contact times of 10 to 60 minutes.

*Example IV*

An extraction and back-extraction experiment was carried out using a plant waste solution containing pentavalent neptunium, tetravalent plutonium and fission products in the concentrations indicated in Table V. Extraction was carried out with a 0.3 M trilaurylamine solution in Soltrol at 25° C. and stripping with an aqueous 0.05 M hydroxylamine sulfate solution at 60° C. In both instances, equal volumes of aqueous and organic solutions were used. The decontamination factors obtained in the extraction step, those obtained in the stripping step and the over-all decontamination factors, which are those obtained by the combination of both extraction and stripping steps, are compiled in Table V. (The decontamination factor is $$\frac{\text{amount of fission products in feed}}{\text{amount of Pu and Np in feed}} : \frac{\text{amount of fission products in extract phase}}{\text{amount of Pu and Np in extract phase}}$$

The over-all decontamination factor is the corresponding ratio of concentrations in the feed waste solution to the corresponding concentrations in the strip solution.)

TABLE V

| Fission Product | Fission Product Concn., μc/l. | Decontamination Factor | | |
|---|---|---|---|---|
| | | Extraction | Strip | Overall |
| Ru-Rh-106 | 7.15X10⁷ | 16.9 | 3.9 | 66 |
| Ru-103 | 4.7X10⁷ | 14.7 | 3.4 | 50 |
| Ce-Pr-144 | 3.28X10⁸ | 186 | 1.0 | 186 |
| Zr-Nb-95 | 2.01X10⁸ | 2,100 | 1.4 | 2900 |

The process brought about especially good decontamination from zirconium and niobium in the extraction step, but the factors for the other fission products were also very satisfactory.

*Example V*

This example is to illustrate the regeneration of trilaurylamine with an alkaline potassium permanganate solution. Two procedures were studied; in one the sodium hydroxide and the permanganate were first mixed and then the mixture was contacted with the organic phase to be stripped from fission products (method A). In the other method, method B, the permanganate was first added to the trilaurylamine solution to be treated, and the sodium hydroxide was then incorporated. The concentrations used of sodium hydroxide and permanganate, the volume ratio of aqueous solution:organic phase and the decontamination factors obtained are compiled in Table VI.

TABLE VI

| Wash | | Aqueous, Organic | Method | Decontamination Factors | | |
|---|---|---|---|---|---|---|
| NaOH, M | KMnO₄, M | | | Ru-106 | Ru-103 | Zr-Nb-95 |
| 0.5 | 0.015 | 1 | A | 64 | 48 | 350 |
| 0.5 | 0.015 | 1 | B | 168 | | 250 |
| 2.0 | 0.015 | 0.25 | A | 450 | 520 | 22,000 |
| 2.0 | 0.015 | 0.25 | B | 210 | 140 | 55 |

The above results indicate that method A, in which the permanganate is mixed with the sodium hydroxide prior to contact with the trilaurylamine solution, is superior to the alkalinization of the organic phase after incorporation of the permanganate.

It will be understood that the invention is not to be limited to the details given herein but that it may be modified within the scope of the appended claims.

What is claimed is:

1. The process of extracting neptunium and plutonium values from an aqueous nitric acid waste solution containing pentavalent neptunium values, tetravalent plutonium values and fission product values comprising adding an aqueous solution containing 0.02 to 0.05 M hydrazine to said waste solution at room temperature for a minimum of 30 minutes, whereby the neptunium values are selectively reduced to the tetravalent state, contacting the solution with an organic water-immiscible solution of trilaurylamine, whereby both tetravalent neptunium and tetravalent plutonium values are taken up by an organic trilaurylamine extract phase, while said fission product values remain in the waste solution, and separating the organic phase from the aqueous waste solution.

2. The process of claim 1 wherein the trilaurylamine solution has a concentration of between 0.2 and 0.3 M and the organic solvent is a mixture of hydrocarbons.

3. The process of extracting neptunium and plutonium values from an aqueous nitric acid waste solution containing pentavalent neptunium values, tetravalent plutonium values and fission product values comprising adding an aqueous solution containing 0.02 to 0.05 M hydrazine to said waste solution at room temperature for a minimum of 30 minutes, whereby the neptunium values are selectively reduced to the tetravalent state, contacting the solution with an organic water-immiscible solution of trilaurylamine, whereby both tetravalent neptunium and tetravalent plutonium values are taken up by an organic trilaurylamine extract phase, while said fission product values remain in the waste solution, separating the organic phase from the aqueous waste solution, contacting the organic phase with an aqueous hydroxylamine sulfate stripping solution at elevated temperature, whereby neptunium and plutonium values are taken up by said aqueous stripping solution, while fission product values that had been coextracted into the trilaurylamine solution remain in said trilaurylamine solution and recycling the trilaurylamine solution for a number of times into new batches of hydrazine-reduced aqueous waste solution, each time repeating stripping with hydroxylamine sulfate.

4. The process of claim 3 wherein hydroxylamine sulfate is added in the form of an aqueous solution that has a concentration of between 0.03 and 0.06 M and said elevated temperature is between 50 and 60° C.

5. The process of claim 3 wherein said organic trilaurylamine extract phase, after a number of uses, is contacted with an aqueous alkaline solution of permanganate at between 50 and 60° C. whereby fission products are removed from said trilaurylamine solution and taken up by said permanganate solution.

6. The process of claim 5 wherein the permanganate is potassium permanganate.

References Cited

UNITED STATES PATENTS 3,047,360   7/1962   Sheppard _____ 23—340

CARL D. QUARFORTH, *Primary Examiner.*

BENJAMIN R. PADGETT, *Examiner.*

S. TRAUB, R. L. GRUDZIECKI *Assistant Examiners.*